No. 608,707. Patented Aug. 9, 1898.
A. A. PATTERSON.
MUSIC HOLDER AND TURNER.
(Application filed Aug. 31, 1897.)
(No Model.) 2 Sheets—Sheet 1.
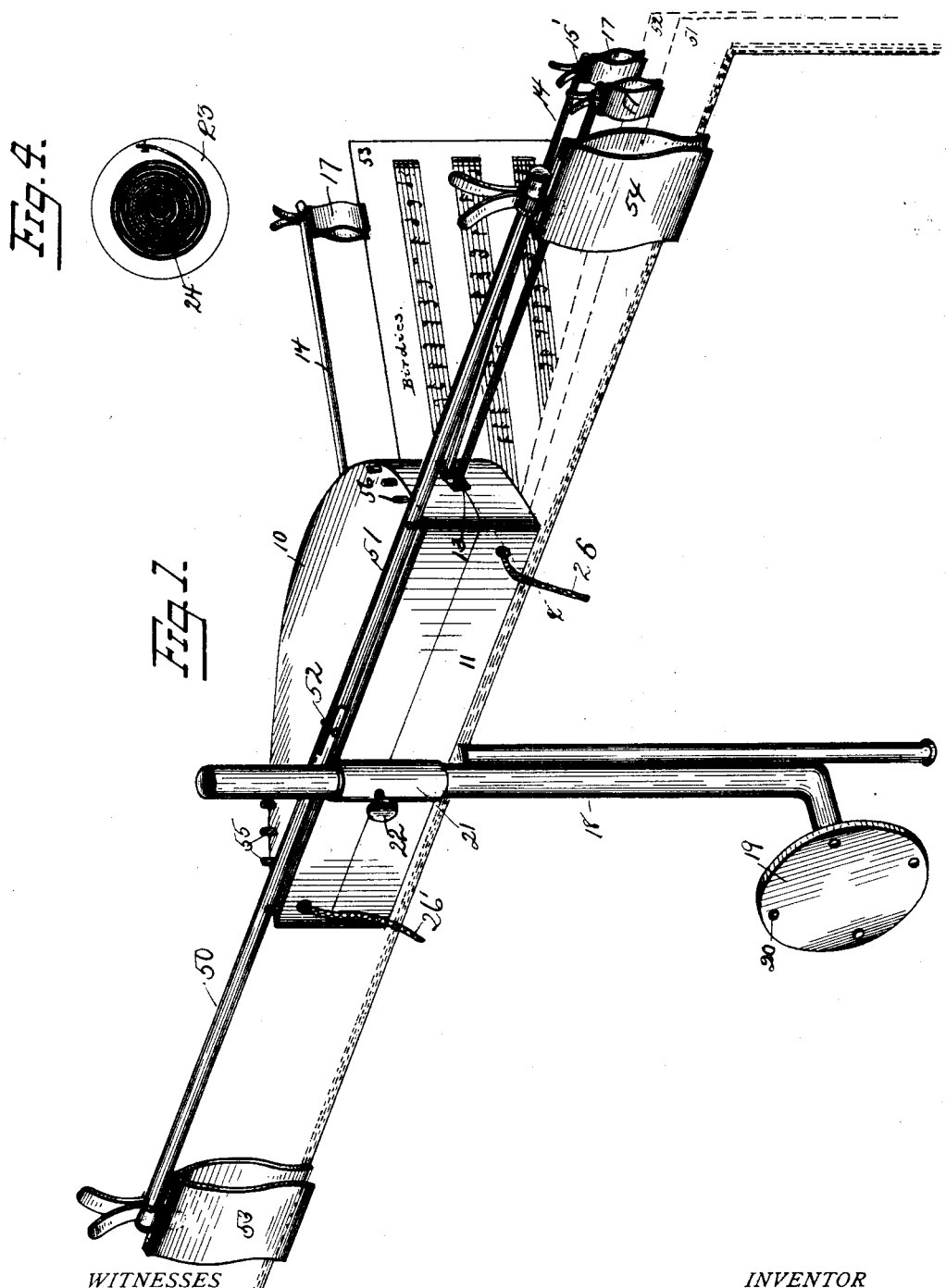
WITNESSES
INVENTOR
Abram A. Patterson
Attorneys
THE NORRIS PETERS CO., PHOTO-LITHO., WASHINGTON, D. C.

No. 608,707. Patented Aug. 9, 1898.
A. A. PATTERSON.
MUSIC HOLDER AND TURNER.
(Application filed Aug. 31, 1897.)

(No Model.) 2 Sheets—Sheet 2.

UNITED STATES PATENT OFFICE.

ABRAM A. PATTERSON, OF WILBUR, WASHINGTON.

MUSIC HOLDER AND TURNER.

SPECIFICATION forming part of Letters Patent No. 608,707, dated August 9, 1898.

Application filed August 31, 1897. Serial No. 650,120. (No model.)

*To all whom it may concern:*

Be it known that I, ABRAM A. PATTERSON, a citizen of the United States, residing at Wilbur, in the county of Lincoln, State of Washington, have invented certain new and useful Improvements in Music Holders and Turners; and I do hereby declare the following to be a full, clear, and exact description of the invention, such as will enable others skilled in the art to which it appertains to make and use the same.

My invention relates to music-leaf turners, and has for its object to provide a device of this nature which is simple and cheap of construction and ready of operation.

In the drawings forming a portion of this specification, and in which like numerals of reference indicate similar parts in the several views, Figure 1 is a perspective view showing the rear of my device complete. Fig. 2 is a horizontal section on line 2 2 of Fig. 1, showing the lower half of the casing of my device. Fig. 3 is a perspective view, partly in dotted lines, showing the upper half of the casing. Fig. 4 is a vertical section of one of the winding-drums used by me. Fig. 5 is a detail of the carriage. Figs. 6 and 7 are views of different forms of standards, and Fig. 8 is a group of detail views showing the disk in different positions as the arms are moved therefrom.

Referring now to the drawings, in constructing a device in accordance with my invention I form a casing comprising upper and lower sections 10 and 11, respectively, each of which sections is formed of sheet metal and is provided with a semicircular front.

Referring to Fig. 2, it will be noted that the lower section of the casing is formed of sheet metal and consists of an open-topped box, the front semicircular face of which is provided in its upper edge with a groove 12, extending to a point adjacent each end of the semicircular portion, at which points the height of the casing is slightly higher, for a purpose as will be presently explained.

The second casing element 10 is similar to the element 11, and when placed one upon the other, as shown in Fig. 1, the result is the formation of a groove 13 in the front of the casing, through which groove extends a plurality of arms 14, which said arms are provided with eyes 15 at their inner ends, said eyes inclosing a common pivot-rod 16, as shown in Fig. 2. The arms 14 are each provided at their outer ends 15' with a spring-clip 17, adapted to clamp the leaves of the music to be turned, such arms being successively rotated upon their common pivot to transfer the leaves from one side to the other in a manner as will be presently explained.

In order to support the casing and its mechanism to manipulate the leaves of the music, I provide a rod or standard 18, having at its lower end any desired means for fastening it in position, such as a plate 19, perforated at 20 for the reception of screws. A sleeve 21, attached to the back of the casing elements, is slipped over the rod or standard 18 and is vertically adjustable thereon, the sleeve, and therewith the casing, being held at any desired elevation through the medium of a set-screw 22.

In order to manipulate the arms 14, I journal at one end of the groove 12 in the casing element 11 a drum 23, which latter is provided with an interior spring 24, adapted to resist rotation of the drum and to return it to its normal position in the usual manner. Wound upon the drum 23 and secured at one end thereto is a cord 24'', the opposite end of which cord is attached to a carriage 25, adapted to travel within the groove and having attached thereto, also, a second cord 26, which latter lies within the groove 12 and is passed over a pulley 36' at the opposite end of the groove and out through the opening 27 in the rear wall of the casing.

Pivoted within the carriage 25 is a block 27'', having an upwardly-extending finger 28 held normally in a vertical position through the medium of a spring 29, a stop 30 being arranged to prevent rearward movement of the block and finger.

Pivoted within the groove 12 and adjacent the drum 23 is a cam 31, having in its projecting edge a series of depressions 32, corresponding in number to the arms 14. This cam is so arranged that when the arms are all at the limit of their motion adjacent the drum 23 the outermost arm will lie in the first depression 32, the remaining arms so lying as to be successively engaged by their respective depressions of the cam.

The operation of this portion of my device is as follows: Normally the first arm will lie in the first depression in the cam 31, the succeeding arms so lying as to be successively engaged and advanced by the cam as it is rotated. Then the cord 26 being released the drum 23 winds up the cord 24" and draws the carriage 25 to the adjacent end of the groove 12, the finger 28 engaging the first arm 14 and passing thereunder. When the finger is passed beyond the arm, it rises, the carriage being stopped by a projection 60 within the groove 12, and upon then drawing upon the string 26 the carriage will pass along the groove to the opposite end thereof, and the arm and the music-leaf attached thereto will pass with it. As the arm moves from its respective groove 32 in the cam 31 it engages the side of the groove and gives said cam a partial rotation, and the next depression engaging its respective arm raises it and moves it forward to be engaged by the finger 28, when the carriage is returned to its initial position.

The upper portion 10 of the casing is similar to the lower portion both in respect to its shape and also with respect to the mechanism carried thereby, it being provided with a spring-operated drum 23', upon which is wound a cord 24'. The free end of cord 24' is secured to the end of a carriage 29', said carriage 29' having also attached thereto a second cord 26', said cord and carriage operating in a groove 12' in the front semicircular wall of the casing, the carriage being supported in an inverted position by means of lugs 61, which run upon tracks 62 on the inner faces of the walls, and the cord 26' passing over the pulley 36' and out through an opening 27'. The upper portion of the casing, however, is not provided with a cam corresponding to the cam 31, said corresponding cam being arranged upon the lower portion 11, as shown at 31' in Fig. 2, and having recesses 32' to receive the arms.

The return of the arms 14 is accomplished in the same manner as above described, the only difference being that to return the arms the cord 26' is manipulated, the arms 14 having engaged their respective recesses 32' in the cam 31' and moved the latter to a position holding the outermost arm in a position to be engaged by the finger 28' of carriage 29'. The finger being in engagement with the first arm and the cord 26' drawn upon, the arm will be returned to its original position and entering its respective depression in cam 31 will rock the latter to receive the second arm in its proper position. The carriage 29' will of course act on the tracks 62, and its rearward movement will be limited by a stop 64 in groove 12', so that the finger 28' will at all times engage the arm last advanced by the cam 31'.

In order to operate the cords 26 and 26', they may be attached to suitable levers so arranged as to be readily engaged by the knees of a person sitting at the piano or the organ upon which the device may be used, though it will be readily understood that the same construction may be employed in connection with a music-rack and the strings passed to a treadle so positioned as to be engaged by the foot.

When employing my turner in connection with a book, it is of course necessary to hold the unused pages back in place, and in Fig. 1 of the drawings I have shown means for accomplishing this result. Midway of the ends of the casing I arrange two arms 50 and 51 upon a common pivot 52, which arms extend laterally in opposite directions and are provided with clips 53 and 54 of such size and arrangement as to enable them to engage the back of the book and those pages thereof as are not in use, as shown. In order that the positions of these arms may vary to some extent, I arrange stops 55 and 56, between any two of which the arms may be seated.

In Fig. 6 of the drawings I have shown a different form of standard 18', the lower end of which is provided with an angular extension 40, having pivotal connection with the ears 41 and 42 of a plate 43, which said plate is provided with perforations adapted to receive screws or other means of attachment to a suitable support. In order to hold the standard erect, a brace 44, pivoted thereto, is extended rearwardly and rests in a suitable notch of a rack 43', properly located.

In Fig. 7 I have shown a different form of standard $18^2$, the lower end of which is bent at an angle and is adapted to enter a sleeve 45, having means for attachment to a suitable support, a set-screw 46 holding said standard within the sleeve.

It will be readily understood that I may vary the specific construction and arrangement herein shown and described without departing from the spirit of my invention and that I may also attach the device to whatever support or instrument may be desired.

Having thus described my invention, what I claim is—

1. A music-leaf turner comprising a casing and a support therefor, a plurality of arms pivoted within the casing and projecting therefrom, pivoted supports for the arms adapted to project them successively forward, clips carried by the arms, a carriage movable within the casing and adapted to successively engage the arms, and means for moving said carriage.

2. A device of the class described comprising a casing having a suitable support, a plurality of arms provided with clips pivoted within the casing and extending therefrom, pivoted supports for the arms adapted to project them forward, a carriage movable within the casing adapted to successively engage the arms and move them from one limit of their motion to the other and a second carriage movable within the casing and adapted to successively return the said arms.

3. A music leaf-turner comprising a casing formed in two parts, a groove extending into the casing, a plurality of arms provided with clips pivoted within the casing and extending outwardly through the groove, pivoted supports for the arms adapted to project them forward, a carriage located in one part of the casing and adapted to engage the arms and move them, means for operating said carriage and a second carriage in the second part of the casing adapted to successively engage the arms and return them to their normal positions and means for operating the second carriage.

4. In a device of the class described, a casing having arms pivoted therein and extending therefrom, pivoted supports for the arms adapted to project them forward, clips carried by the arms, grooves in the casing, a carriage in each groove, a finger carried by each carriage adapted to engage the arms successively, a flexible connection with each carriage lying within the groove and adapted to move the carriages each in one direction, a second cord attached to each carriage and lying within the groove and a spring-actuated drum having connection with the second cord of each carriage and adapted to return its carriage when the first-named cords are released.

5. In a music-leaf turner, the combination with a casing and a support therefor, of a plurality of arms pivoted within the casing and projecting therefrom, clips carried by the arms, grooves within the casing, a carriage within each groove having a finger adapted to engage the arms successively, pivoted supports for the arms adapted to deliver the arms successively to the fingers of the carriages, and means for moving the carriages.

6. In a music-leaf turner, the combination with a casing and a support therefor, of a plurality of arms pivoted within the casing and projecting therefrom, grooves within the casing, a carriage in each groove, one of said carriages being inverted, a spring-pressed finger in each carriage adapted to engage the arms successively, pivoted supports for the arms adapted to deliver the arms to be engaged by the fingers of their respective carriages, and means for operating the carriages.

7. In a music-leaf turner, the combination with a casing and a support therefor, of a plurality of arms pivoted within the casing and projecting therefrom, grooves in the casing, a carriage in each groove, a spring-pressed finger in each carriage, adapted to engage the arms successively, a cam pivoted within the casing at each end of the arc of movement of the arms, recesses in each cam adapted to receive their respective arms and move them forwardly as the cam is rotated on its pivot, to be engaged by a finger of a carriage, means for moving each carriage in one direction and a spring-operated drum having connections with each carriage, said drums being adapted to return their respective carriages and hold them normally at opposite ends of the arc of movement of the arms.

In testimony whereof, I affix my signature in presence of two witnesses.

ABRAM A. PATTERSON.

Witnesses:
E. A. HESSELTINE,
C. R. HESSELTINE.